United States Patent [19]

Gouirand

[11] Patent Number: 5,130,534
[45] Date of Patent: Jul. 14, 1992

[54] ADJUSTABLE OPTICAL BIPROBE FOR LOCAL DIPHASIC MEASUREMENTS

[75] Inventor: Jean M. Gouirand, Venelles, France

[73] Assignee: Commissariat A l'Energie Atomique, France

[21] Appl. No.: 651,198

[22] Filed: Feb. 6, 1991

[30] Foreign Application Priority Data

Feb. 23, 1990 [FR] France ................ 90 02271

[51] Int. Cl.⁵ .................................. G01P 5/00
[52] U.S. Cl. .................. 250/227.30; 250/227.11; 250/227.26
[58] Field of Search ........ 250/227.11, 227.26, 250/227.30; 356/133, 28

[56] References Cited

U.S. PATENT DOCUMENTS 3,867,033  2/1975  Hasinger ............... 356/342
4,659,218  4/1987  de Lasa et al. ........ 356/133

FOREIGN PATENT DOCUMENTS 1055265  4/1959  Fed. Rep. of Germany .

Primary Examiner—Carolyn E. Fields
Attorney, Agent, or Firm—Hayes, Soloway Hennessey & Hage

[57] ABSTRACT

An optical biprobe for observing a flow in any direction in a diphasic emulsion is provided. In a preferred embodiment, the optical biprobe comprises a support which is capable of rotating about a first axis on which is mounted a hollow member for intruding into the emulsion. At least two optical fibers are mounted in the support such that the optical fibers extrude from the hollow member and are fixed at a predetermined distance from one another. The hollow member is pivotally about a second axis perpendicular to the first axis. Completing the biprobe is an actuator for controlling the pivoting of the hollow member about the second axis.

5 Claims, 1 Drawing Sheet

ADJUSTABLE OPTICAL BIPROBE FOR LOCAL DIPHASIC MEASUREMENTS

FIELD OF THE INVENTION

The present invention concerns measurement in diphasic emulsions, that is in media in which in variable proportions a gaseous phase and a liquid phase are mixed, and more particularly the invention concerns the observation and determination of the flow speed of this diphasic emulsion in any direction in space.

BACKGROUND OF THE INVENTION

At least since 1971, optical probes have been produced conventionally and have been introduced into the diphasic medium to be measured and whose functioning mainly depends on the presence of optical fibers, the extremity of these fibers being suitably machined so as to provide good vision.

Such optical fibers function as follows: if light is sent by means of such a fiber, this light is refracted inside the medium if the sensitive extremity of the fiber is surrounded with liquid and, on the other hand, this light is totally refracted and accordingly returned into the same fiber when the sensitive extremity is surrounded with gas or vapor. Consequently, if the reflected light returned into the emitting fiber is detected, this implies the existence of a gaseous phase around the sensitive extremity of this fiber.

Such a known device accordingly makes it possible to know at each moment whether at any particular point of a medium this device is present in a liquid phase or a gaseous phase. However, a single fiber is unable to obtain information concerning the direction and speed of a possible flow inside this diphasic emulsion.

In order to resolve this problem, the invention aims to provide a double optical probe or biprobe comprising side by side two parallel optical fibers, as shown in FIG. 1. Such an optical probe mainly comprises a hollow cylindrical tube 2 made of a rigid material and intended to penetrate as far as the emulsion point it is desired to observe. This hollow cylindrical tube 2 is blocked off at its observation extremity by a cylindrical support 4 comprising two orifices, guiding tubes 6 and 8 being mounted into these orifices and intended for passage of two optical fibers 10 and 12 whose extremities 14 and 16 have been suitably machined so as to allow for correct optical observation. The unit of the system, that is the hollow cylindrical tube 2, rotates around its longitudinal axis XY. One can readily understand that such a known device is able to detect and even measure a flow speed of the observed biphasic medium as soon as the liquid particles and/or gas bubbles were to move successively in front of the extremities 14 and 16 of the optical fibers 10 and 12. By measuring the transit time of such phenomena between the two extremities 14 and 16, it is relatively simple to accurately deduce the flow speed of the diphasic emulsion at this location.

Nevertheless, it can be readily understood that the optical biprobe of FIG. 1 is able to only measure a speed vector contained in a plane perpendicular to its axis XY. This accordingly considerably limits the application and requires several successive penetrations of this biprobe along two different directions if it is desired to disclose and measure the speed of a flow in a direction in space not perpendicular to the axis XY.

SUMMARY OF THE INVENTION

The object of the present invention is to provide an adjustable optical biprobe allowing for the observation of a flow of any direction in a diphasic emulsion with the aid of a single effective device.

This adjustable optical biprobe to observe a flow of any direction in a diphasic emulsion and comprising two observation optical fibers, mounted in a cylindrical support blocking off the extremity of a hollow cylindrical tube for penetrating into the emulsion and rotating around its longitudinal axis, is characterized in that the cylindrical support is mounted rotating around a transverse axis linked to the hollow cylinder and perpendicular to the longitudinal axis of the latter, and in that a rod assembly, linked to the cylindrical support and traversing the hollow cylindrical tube, makes it possible from the tube inlet to control the state of the cylindrical support rotating around the transverse axis.

In other words, the object of the invention concerns an optical biprobe derived from an optical biprobe of the prior art according to FIG. 1, but a biprobe in which the extremity and in particular the cylindrical support 4 of the prior art has been provided so that it rotates around an axis perpendicular to the longitudinal axis XY of the hollow cylindrical tube and that its inclination with respect to this axis can be easily controlled by the observer from the extremity of the optical biprobe situated outside the observed diphasic medium.

BRIEF DESCRIPTION OF THE DRAWINGS

The invention shall be more readily understood by referring to the enclosed drawings, wherein like numerals depict like parts, and wherein.

DETAILED DESCRIPTION OF THE PREFERRED EMBODIMENTS

Figure 1:
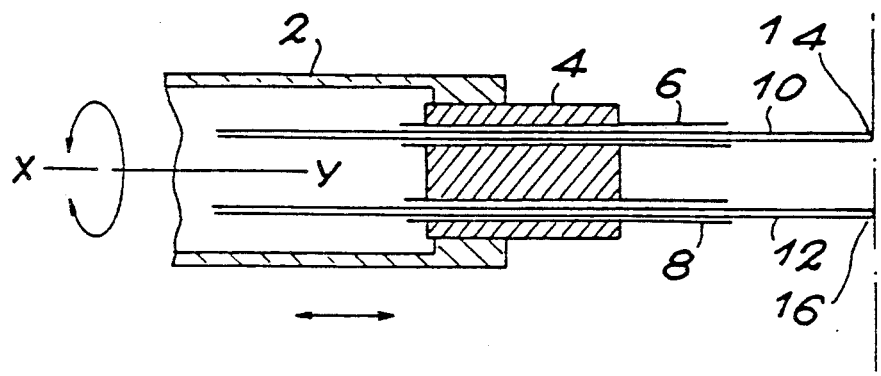
FIG. 1 is a side cross-sectional view of a fiber optic probe made in accordance with the teachings of the prior art.
Figure 2:
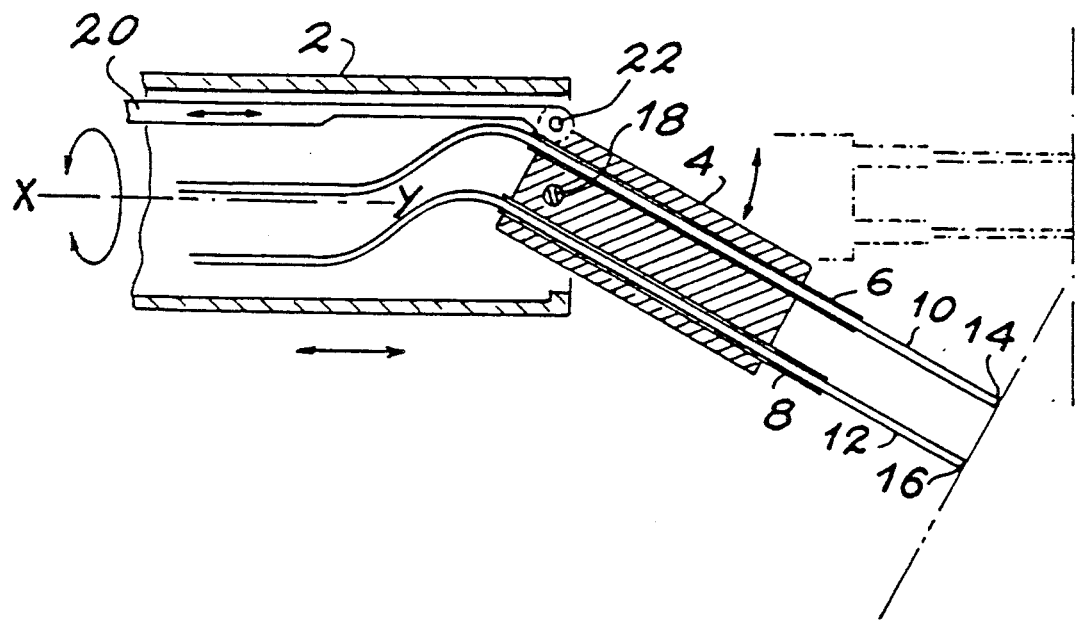
FIG. 2 is a side cross-sectional view of a preferred embodiment of the instant invention, and taken with the following description of one of its embodiments, this description being given by way of illustration and being in no way restrictive, with reference to FIG. 2.

FIG. 2 shows the main elements of an optical biprobe bearing the same references as those on FIG. 1, said biprobe comprising two fibers 10 and 12 mounted parallel at a certain distance from each other.

The originality of the mode for implementing the invention described on FIG. 2 concerns the existence of an axis 18 perpendicular to the longitudinal axis XY of the biprobe and secured to the walls of the hollow cylindrical tube 2. This axis, to which the cylindrical support 4 is linked and around which it is able to rotate, makes it possible, by means of a rod assembly 20 articulated around the axis 22 situated on the cylindrical support 4 by means of traction from the outer observation extremity of the biprobe, to tilt the cylindrical support 4 and accordingly orientate the observation plane of the flow speeds in the diphasic emulsion by making it rotate around the axis 18.

Moreover, as the hollow cylindrical tube 2 is still mounted rotating around its longitudinal axis XY, it can be seen that the combination of these two rotating movements makes it possible to place the extremities 14 and 16 of the two optical observation fibers 10 and 12 and accordingly the observation direction of a flow in any direction of the desired space.

The obvious advantage of the adjustable optical biprobe of the invention resides in the fact that a single penetration into the medium to be observed is required instead of two perpendicular penetrations using two optical biprobes so as to ensure the measurement of a displacement speed of any direction. This constitutes a significant advantage in the case where two perpendicular penetrations are still not possible when the complexity of the devices in which the flow takes place does not allow this to occur.

This adjustable optical biprobe may be used in many cases of figures and makes it possible to identify certain factors, such as vortex phenomena, flow direction inversion or flowrate instability. It may also be used, if desired, to measure the three components of the flow speed at any specific point, this also being advantageous for analyzing certain biphasic flows in complex-shaped structures.

This adjustable optical biprobe may carry out measurements in any nonconducting or conductive biphasic fluid (gas liquid or vapor liquid) whose speeds are, for example, less than or equal to 15 m/s.

In one embodiment of the biprobe of the invention, its mechanical resistance is such that it may support 50 bars at a temperature of 150° C. Only chemically aggressive media are to be avoided if they are likely to chemically attack the optical fibers.

What is claimed is:

1. An optical biprobe for sensing a flow in any direction in a diphasic emulsion, and comprising:
   a. a hollow tube rotatably mounted about a first axis;
   b. a support member carried by said tube and pivotably mounted adjacent one end of said tube about a second axis transverse to said first axis;
   c. actuation means accessible from the other end of said tube for controlling pivoting of said support member about said second axis; and
   d. at least two optical fibers mounted in said support member and extending from the other end of said support member.

2. A biprobe according to claim 1, wherein said support member comprises a cylindrically shaped body.

3. A biprobe according to claim 2, wherein said hollow member comprises a cylindrical tube.

4. A biprobe according to claim 3, wherein said actuation means comprises a rod assembly.

5. A biprobe according to claim 1, wherein said optical fibers are spaced from one another at a predetermined distance.

* * * * *